June 10, 1969  E. R. WALL, JR  3,448,793
MATRIX SEAL
Filed Jan. 15, 1965

INVENTOR.
Earle R. Wall, Jr.
BY
Paul Fitzpatrick
ATTORNEY

United States Patent Office 3,448,793
Patented June 10, 1969

3,448,793
MATRIX SEAL
Earle R. Wall, Jr., Indianapolis, Ind., assignor to General Motors Corporation, Detroit, Mich., a corporation of Delaware
Filed Jan. 15, 1965, Ser. No. 425,789
Int. Cl. F28d 19/00; F23l 15/02
U.S. Cl. 165—9      8 Claims This invention relates to rotary regenerators, especially those for gas turbine engines, and more specifically it relates to a matrix assembly featuring a nondeflecting seal construction for such a rotary regenerator.

If we consider a regenerator matrix as an element of rectangular cross section which is considerably hotter at one surface than at the opposite surface, the natural result will be a greater heating of the hotter surface and a distortion of the matrix into an irregular shape. The matrix distortion is such that these sides of the cross-section of the regenerator are arcs across the regenerator surface. This has substantial effect upon the sealing of such a device. Various ideas have been proposed to cause the stationary seal structure through which the regenerator rotates to conform itself to the matrix upon distortion thereof in order to maintain effective sealing. The purpose of the present invention, however, is to eliminate or at least minimize the distortion of the matrix seal elements so that regardless of the distortion occurring in the matrix, an effective sealing means is maintained by the rotary regenerator.

In general, then, the subject invention is a seal structure which is spaced at periodic intervals within the matrix structure of a rotary regenerator. The subject seal assembly, in its preferred embodiment in a radial-flow matrix, includes a nondeflecting seal construction and a heat transferring filler assembly held between plates which are attached to end rims extending around the circumference of the rotary regenerator.

It should be clear that, though the subject invention is described with respect to its use in a rotary regenerator for a gas turbine engine, it has many uses in heat exchange apparatus wherein effective sealing is important.

Therefore, the subject invention has as its main object the creation of a rotary regenerator matrix structure intended to minimize thermal distortion of the seal or labyrinth elements which project from the surface of the matrix to cooperate with seals on the stationary housing within which the regenerator rotates.

Other objects, features and advantages of the subject invention will become apparent upon reference to the succeeding detailed description of the preferred embodiment of the invention and the drawings thereof, wherein.

Figure 1:
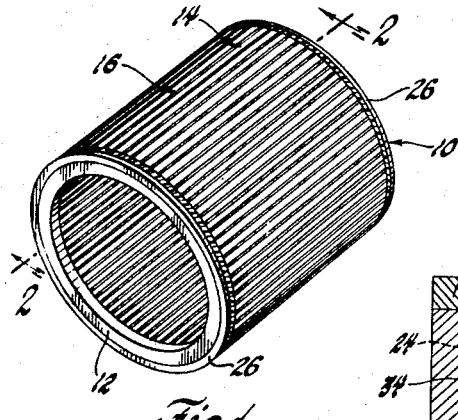
FIGURE 1 is a perspective view of a rotary regenerator matrix including the subject matrix construction.
Figure 2:
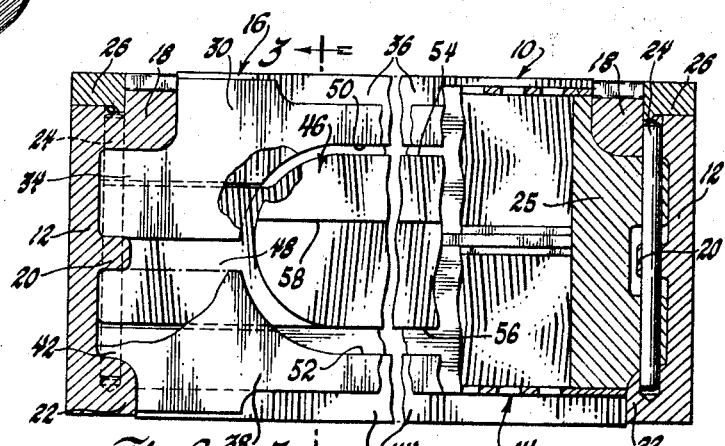
FIGURE 2 is a sectional view with parts broken away as taken in the direction of arrows 2—2 in FIGURE 1.

More particularly, FIGURE 1 shows the subject invention as used in a rotary regenerator matrix 10 which is comprised of end rims 12, shim pack structures 14, and spaced seal assemblies 16. As seen in FIGURE 2, the end rims 12 have flanges 18, 20, and 22 through which openings are formed for pins 24. A removable retaining ring 26 is used to hold the pins 24 in position and to allow them to be inserted or withdrawn. The pins 24 hold stiffener bars 25 partially shown in FIGURE 2 to the end rims 12. Approximately a dozen of these stiffener bars are spaced around the circumference to provide a rigid connection between the rims 12. These are not shown in the small segments shown in the drawings. The shim pack structure 14 may be any well-known heat exchange construction and, therefore, is not shown in detail. An example of such a construction is a plurality of corrugated metal sheets 15 laminated together to form a heat transfer shim pack. Spaced between the shim pack structures 14 are a plurality of labyrinth seal blade assemblies 16. These assemblies incorporate sealing elements which project radially inward and outward beyond the shim pack structure 14, and pass in close clearance or in sealing contact with the stationary seal member 28, which is attached to the regenerator housing (not shown).

It is the particular structure and arrangement of parts in this labyrinth seal blade assembly with which we are primarily interested in the subject invention. The sealing means includes a pair of outer plates 30 and 32 which have tabs 34 fitting between flanges 18 and 20 on the end rims 12. Placed between the plate members 30 and 32 is an outer seal 36, which is a corrugated labyrinth seal blade the ends of which are welded to the plate members 30 and 32 near their outer extremities. Spaced radially inward from the outer plate members 30 and 32 is a pair of inner plate members 38 and 40, which have tab portions 42 cooperating with the flanges 20 and 22 on the end rims 12. Placed between the inner plate members 38 and 40 is a labyrinth seal blade 44, the ends of which are welded to the plate members 38 and 40 near their radial inner extremities. It is to be noted that the inner seal assembly is thinner than the outer assembly because of necessity resulting from the smaller inner circumference.

Figure 3:
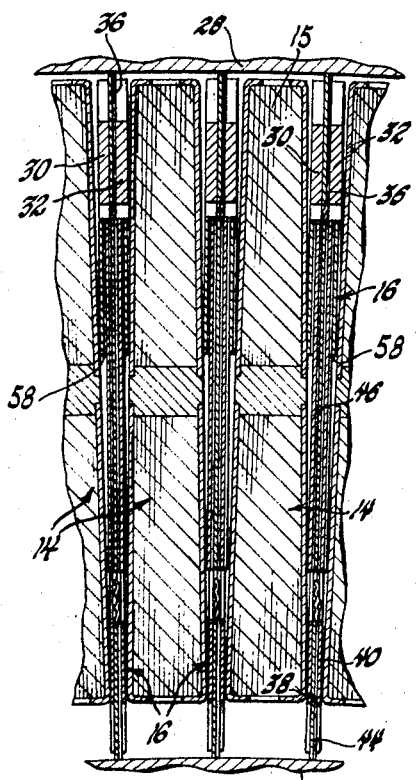
FIGURE 3 is a sectional view taken in the direction of the arrows 3—3 in FIGURE 2.
Figure 4:
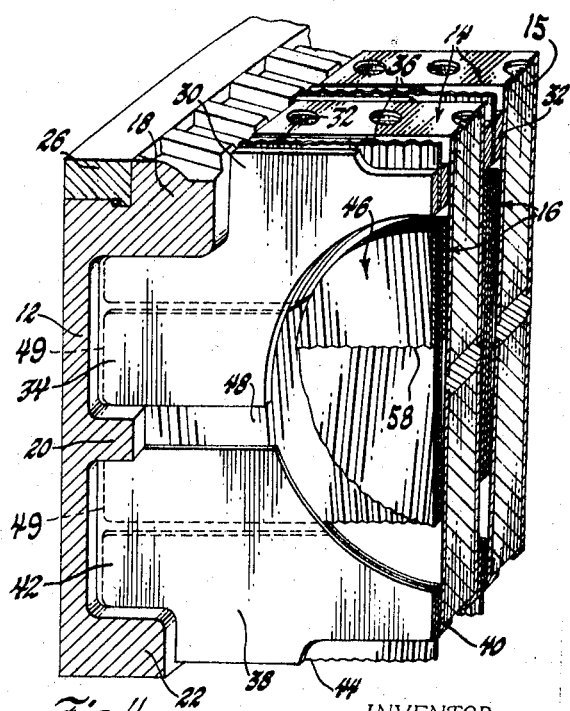
FIGURE 4 is a sectional view further showing the component parts of the subject matrix assembly.

As seen in FIGURE 4, a spacer assembly 46 is located between the outer pair of plates 30 and 32 and the inner pair 38 and 40 and has end portions 48 which extend to the rims and terminate in portions 49 which straddle flanges 20 on each rim to locate the spacer assembly. End portions 48 are slidably fitted between plates 30 and 32 and between plates 38 and 40. This spacer assembly 46 is very similar in construction to the matrix elements 14 except, as seen in FIGURE 3, the metal sheets are connected in a shingled pattern so that they taper and the assembly is thicker at its radially outer extremity than at its radially inner extremity. The spacer assembly 46 is spaced from the outer and inner plate members to allow for radial expansion therebetween and is sandwiched in the circumferential direction between the matrix structures 14. Referring to FIGURES 2, 3 and 4, the inner edge 50 of the outer plates 30 and 32 and the outer edge 52 of the inner plates 38 and 40 define between them a sort of window within which the body of the spacer assembly 46, apart from the end portions 48, is disposed. The upper and lower edges 54 and 56 of the pack assembly are indicated in FIGURE 2. Note also in FIGURES 2, 3 and 4 that the shingled construction of the spacer assembly 46 which makes it thicker towards the outer margin of the assembly is indicated by the termination at 58 of the outermost sheets of the spacer assembly. Hence, it can be seen that the spacer assembly provides necessary circumferential clearance for independent action of the labyrinth blade assembly. In order words, spacer 46 holds the shim packs 14 from pressing against plate members 30, 32, 38 and 40.

The seal elements 36 and 44 preferably have a lower coefficient of thermal expansion than the plate members between which they are fixed so that they will be in tension when the matrix is heated during operation. Since the parts are corrugated, the tensile pull may not be very great but since the plate members are in tension the natural tendency is for their edges to remain substantially in a single plane and to thereby retain their sealing edges in proper alignment. While the plate members may bow they tend to pull the sealing means 36 and 44 into a rectangular shape, thereby compensating for distortion in the matrix structure and maintaining the over-all effective sealing of the regenerator.

It is not necessary that the seal elements 36 and 44 have a lower coefficient of expansion than the plate members 30, 32, 38, and 40. The seal elements 36 and 44 may remain in tension at all times.

The relatively radially narrow bars 30, 32, 38 and 40 will not have a very great temperature difference between their radially inner and outer edges. Moreover, it is contemplated that these elements may be made of a clad copper material. In this case because of the high conductivity of the copper, the bars will be substantially at uniform temperature and have relatively small curvature. However, any curvature of the bars has but slight effect upon the seal elements 36 and 44 since these are held in tension between the two ends and thus will normally be pulled essentially straight even though there is some thermal deformation of the plate members on which they are mounted.

It will be noted that the foregoing description relates to an embodiment of the invention in a radial-flow regenerator in which the flow of gas is from the radially inner side to the radially outer side, or vice versa. It will be apparent that the same principles of structure may be employed in an axial-flow or disk type regenerator, in which case the elements would extend from an inner rim to an outer rim and the seal elements 36 and 44 and the plates in which they are mounted as well as the spacer 46 will extend radially from the axis rather than parallel to the axis. In this case, the spacer assembly 46 may taper from the inner to the outer diameter and the plate members 30, 32, 38, and 40 may also taper. In general, however, the invention appears to be better adapted to a radial-flow matrix than an axial-flow.

Although but one embodiment of the subject invention has been shown and described, it should be apparent that many changes and modifications may be made thereto without departing from the scope of the invention as set forth in the following claims.

I claim:

1. A rotary regenerator matrix comprising a generally annular body of heat transfer material having a generally rectangular cross-section with two sides and two ends, the heat transfer material having a porous structure providing for fluid flow from one side to the other, the matrix normally having a temperature gradient between the sides when in operation; labyrinth sealing means extending across the sides and projecting slightly from the sides for cooperation with structure external to the matrix, the sealing means comprising rigid plates extending from end to end of the matrix and flexible seal blades fixed to said plates and maintained in tension by said plates so as to be maintained substantially rectilinear by such tension; and spacer means disposed within the matrix engaging the heat transfer material and taking circumferential pressure of the heat transfer material off the sealing means.

2. A rotary regenerator matrix comprising a generally annular body of heat transfer material having a generally rectangular cross-section with two sides and two ends, the heat transfer material having a porous structure providing for fluid flow from one side to the other, the matrix normally having a temperature gradient between the sides when in operation; labyrinth sealing means extending across the sides and projecting slightly from the sides for cooperation with structure external to the matrix, the sealing means comprising rigid plates extending from end to end of the matrix and flexible seal blades fixed to said plates and maintained in tension by said plates so as to be maintained substantially rectilinear by such tension; and spacer means disposed within the matrix engaging the heat transfer material and taking circumferential pressure of the heat transfer material off the seal blades.

3. A rotary regenerator matrix comprising a generally annular body of heat transfer material having a generally rectangular cross-section with two sides and two ends, the heat transfer material having a porous structure providing for fluid flow from one side to the other, the matrix normally having a temperature gradient between the sides when in operation; labyrinth sealing means extending across the sides and projecting slightly from the sides for cooperation with structure external to the matrix, the sealing means comprising rigid plates of a first set extending from end to end of the matrix at one side thereof and rigid plates of a second set extending from end to end of the matrix at the other side thereof and flexible seal blades fixed to said plates of each set and maintained in tension by said plates so as to be maintained substantially rectilinear by such tension; and spacer means disposed within the matrix between the sets of plates engaging the heat transfer material and taking circumferential pressure of the heat transfer material off the sealing means.

4. A rotary regenerator matrix comprising, in combination:

two spaced rims;

means structurally connecting the rims;

foraminous heat transfer structure having two faces and extending from one rim to the other open to flow of fluid through the space between the rims from face to face of the heat transfer structure;

labyrinth seal members extending across each face of the heat transfer structure from rim to rim and extending outward from the faces of the heat transfer structure adapted to cooperate with sealing means fixedly disposed adjacent said matrix;

the labyrinth seal members being maintained in tension and having a structure of substantially lower thermal distortion than the heat transfer structure;

and means within the heat transfer structure providing clearance for the labyrinth seal members from the heat transfer structure so that the labyrinth seal members are unaffected by distortion of the matrix.

5. A matrix as recited in claim 4 in which the labyrinth seal member comprises a bar extending between and mounted on the rims and a seal element fixed to the bar so as to be held in tension by the bar, the seal element projecting from the face of the heat transfer structure.

6. A matrix as recited in claim 5 in which the bar is inserted in annular slots in the inner faces of the rims.

7. A matrix as recited in claim 5 in which the said bar comprises two parallel plate members and the seal element is sandwiched between the plate members.

8. A matrix as recited in claim 7 in which the seal element is corrugated with the corrugations extending transverse to the direction from rim to rim.

References Cited

UNITED STATES PATENTS

| 3,181,603 | 5/1965 | Bubniak et al. | 165—9 |
| 3,186,479 | 6/1965 | Mondt | 165—10 |
| 3,216,487 | 11/1965 | Gallagher | 165—9 |

ROBERT A. O'LEARY, *Primary Examiner.*

A. W. DAVIS, *Assistant Examiner.*

U.S. Cl. X.R.

165—10